(12) United States Patent
Zavodnick et al.

(10) Patent No.: US 10,030,369 B2
(45) Date of Patent: Jul. 24, 2018

(54) FAUCET ASSEMBLY FIXTURE

(71) Applicants: Daniel S Zavodnick, Englewood, NJ (US); Alan Zavodnick, Boynton Beach, FL (US); Matthew Patrick Coughlin, Yucaipa, CA (US)

(72) Inventors: Daniel S Zavodnick, Englewood, NJ (US); Alan Zavodnick, Boynton Beach, FL (US); Matthew Patrick Coughlin, Yucaipa, CA (US)

(73) Assignee: Hunter Innovations, LLC, Englewood, NJ (US)

( * ) Notice: Subject to any disclaimer, the term of this patent is extended or adjusted under 35 U.S.C. 154(b) by 24 days.

(21) Appl. No.: 15/174,056

(22) Filed: Jun. 6, 2016

(65) Prior Publication Data

US 2016/0356027 A1  Dec. 8, 2016

Related U.S. Application Data

(60) Provisional application No. 62/230,433, filed on Jun. 6, 2015, provisional application No. 62/219,774, filed on Sep. 17, 2015, provisional application No. 62/276,491, filed on Jan. 8, 2016.

(51) Int. Cl.
| | |
|---|---|
| *E03C 1/042* | (2006.01) |
| *E03C 1/04* | (2006.01) |
| *F16B 13/08* | (2006.01) |
| *F16B 19/00* | (2006.01) |
| *F16B 37/04* | (2006.01) |

(52) U.S. Cl.
CPC .......... *E03C 1/0401* (2013.01); *E03C 1/0402* (2013.01); *F16B 13/0808* (2013.01); *F16B 19/008* (2013.01); *F16B 37/043* (2013.01)

(58) Field of Classification Search
CPC .. E03C 1/0401; E03C 1/0402; F16B 13/0808; F16B 19/008; F16B 37/043
USPC .............................................................. 4/695
See application file for complete search history.

(56) References Cited

U.S. PATENT DOCUMENTS

| | | |
|---|---|---|
| 1,375,747 A | 4/1921 | Zigray |
| 1,467,936 A | 9/1923 | Janssen |
| 2,293,411 A | 8/1942 | Spillman |
| (Continued) | | |

FOREIGN PATENT DOCUMENTS

| | | |
|---|---|---|
| DE | 202008017022 | 3/2009 |
| JP | 08199643 | 8/1996 |

*Primary Examiner* — Benjamin R Shaw
(74) *Attorney, Agent, or Firm* — Cohen & Gigsby, P.C.

(57) ABSTRACT

A faucet assembly device which includes an adapter having a bolt with an axially extending internally threaded bore, and an anchor tab which extends axially from the bolt and includes a radially extending protrusion is disclosed. The adapter is configured to rotatably mechanically couple to an outer surface of a faucet fixture and mount the faucet fixture through a hole in a barrier such as a countertop or sink from a faucet side of the barrier so that the anchor tab may hold the faucet fixture securely on the barrier. The device may also include an alignment tool which allows measurement of a thickness of the barrier and provides alignment of the adapter on the faucet fixture at a position corresponding to the thickness of the barrier. Also disclosed are kits which include the adapter and alignment tool, and methods of use of the devices and kits.

8 Claims, 8 Drawing Sheets

(56) References Cited

U.S. PATENT DOCUMENTS

| | | | |
|---|---|---|---|
| 2,384,525 A | 9/1945 | Beverly | |
| 4,130,152 A | 12/1978 | Bolen | |
| 4,281,857 A * | 8/1981 | Randall | E03C 1/0401 24/498 |
| 4,339,971 A | 7/1982 | Zatorre | |
| 5,090,276 A | 2/1992 | Groskey | |
| 5,353,667 A | 10/1994 | Wilner | |
| 5,515,882 A * | 5/1996 | Hennis | E03C 1/0401 137/315.12 |
| 5,582,548 A | 12/1996 | Czegledi | |
| 5,722,838 A | 3/1998 | Czegledi | |
| 6,138,296 A | 10/2000 | Baker | |
| 6,237,168 B1 | 5/2001 | Daniel et al. | |
| 6,256,810 B1 | 7/2001 | Baker | |
| 6,328,059 B1 * | 12/2001 | Testori | E03C 1/0401 137/315.12 |
| 6,381,776 B1 | 5/2002 | Wang | |
| 6,401,748 B1 | 6/2002 | Wang | |
| 6,484,330 B2 | 11/2002 | Gray et al. | |
| 6,491,058 B1 | 12/2002 | Wang | |
| 6,526,851 B1 | 3/2003 | Fuerle | |
| 6,678,903 B1 | 1/2004 | Rhodes | |
| 6,725,472 B2 | 4/2004 | Gray et al. | |
| 6,792,629 B2 | 9/2004 | Nelson et al. | |
| 6,807,692 B2 | 10/2004 | Tsutsui et al. | |
| 6,912,742 B1 | 7/2005 | Wang | |
| 7,073,416 B2 | 7/2006 | Kozak et al. | |
| 7,216,440 B2 | 5/2007 | Zint | |
| 7,490,619 B2 | 2/2009 | Farag et al. | |
| 7,698,755 B2 | 4/2010 | McNerney et al. | |
| 8,370,971 B2 | 2/2013 | Wang | |
| 8,763,175 B2 * | 7/2014 | Li | E03C 1/0402 137/359 |
| 8,925,571 B2 | 1/2015 | Li et al. | |
| 2003/0204906 A1 * | 11/2003 | Tsutsui | E03C 1/0401 4/695 |
| 2003/0221254 A1 * | 12/2003 | McNerney | E03C 1/0401 4/695 |
| 2006/0200904 A1 * | 9/2006 | Vogel | E03C 1/0401 4/695 |
| 2007/0044232 A1 * | 3/2007 | McNerney | E03C 1/0401 4/695 |
| 2008/0131231 A1 * | 6/2008 | Kuna | E03C 1/0401 411/433 |
| 2012/0047713 A1 * | 3/2012 | Julian | E03C 1/0401 29/525.11 |
| 2012/0090435 A1 | 4/2012 | Dauletbayev | |
| 2012/0137427 A1 * | 6/2012 | Li | E03C 1/0402 4/695 |
| 2013/0048100 A1 | 2/2013 | Jonte et al. | |
| 2013/0152398 A1 | 6/2013 | Wagstaff et al. | |
| 2013/0199623 A1 | 8/2013 | Lloyd | |

* cited by examiner

FAUCET ASSEMBLY FIXTURE

CROSS REFERENCE TO RELATED APPLICATIONS

The present application claims the benefit under 35 U.S.C. § 119(e) of prior U.S. Provisional Application No. 62/230,433 filed Jun. 6, 2015, U.S. Provisional Application No. 62/219,774 filed Sep. 17, 2015, and U.S. Provisional Application No. 62/276,491 filed Jan. 8, 2016, each having the title "Tension-Based Mechanical Coupling Device", the disclosure of each being incorporated herein by reference in its entirety.

TECHNICAL FIELD OF THE INVENTION

The present invention relates generally to installation of plumbing hardware, and more particularly to adapters and alignment tools that simplify installation of plumbing hardware on a countertop, wall, or sink.

BACKGROUND OF THE INVENTION

Installation of a faucet on a surface such as a countertop or sink generally involves mounting portions of the faucet both above and below the surface. For example, the threaded connection pipe of the faucet is introduced into a hole in the countertop or sink unit from above and a screw nut is screwed on from below while maintaining the position of the faucet. To further complicate the installation, much of the plumbing hardware is in the narrow area that is underneath and behind the protruding sink where there is little space for the installer to maneuver, making the working position very uncomfortable; the installer has to lie on their back with arms extended to reach the location of the hardware. This makes it nearly impossible to hold the plumbing hardware on the sink from above while at the same time pulling the screw nut from below the surface. Consequently, the task is complicated and usually requires either two people or a professional plumber.

SUMMARY OF THE INVENTION

The presently disclosed invention overcomes many of the shortcomings of the prior art by providing faucet assembly devices and kits which allow plumbing hardware to be installed from a top or front side of the surface, such as the faucet side of a countertop, wall, or sink.

The faucet assembly device generally includes an adapter comprising a bolt having an axially extending internally threaded bore, and an anchor tab which extends axially from the bolt and comprises a radially extending protrusion. The adapter may be configured to rotatably mechanically couple to an outer surface of a faucet fixture and mount the faucet fixture through a hole in a barrier from a faucet side of the barrier so that the anchor tab may hold the faucet fixture securely on the barrier. The anchor tab may include any number of anchor tabs such as, for example, at least two anchor tabs which may be evenly spaced about a circumferential surface of the bolt.

The faucet assembly device may include an alignment tool configured to measure a thickness of the barrier and provide alignment of the adapter on the faucet fixture at a position corresponding to the measured thickness.

The alignment tool may be a distance between a first end of the anchor tab and a first axial end of the bolt, wherein the distance corresponds to the thickness of the barrier. Exemplary barriers include at least a countertop, wall, or sink, wherein the barrier may be formed of any material such as, for example, 18 gauge steel. In such a case, the anchor tab may include at least two anchor tabs, wherein each anchor tab extends radially from the bolt proximate a second axial end of the bolt and may run parallel to an external surface of the bolt along a longitudinal symmetry axis of the bolt. Each anchor tab may comprise the radially extending protrusion at the first end thereof, wherein the at least two anchor tabs are evenly spaced about a circumferential surface of the bolt.

The alignment tool may include a first elongated guide member, a second elongated guide member, and a collar configured to hold the first and second elongated guide members together and allow the first and second elongated guide members to slide longitudinally relative to one another. The first elongated guide member may comprise a laterally extending hook at each of a first and second end thereof, wherein the measured thickness of the barrier is measured as a first distance between (a) the laterally extending hook at the first end of the first elongated guide member when in contact with a bottom surface of the barrier and (b) a first end of the second elongated guide member when in contact with a top surface of the barrier.

The first distance may correspond to a second distance between the lateral hook at the second end of the first elongated guide member and the second end of the second elongated guide member, the alignment tool configured to use the second distance to provide alignment of the adapter on the faucet fixture. For example, the measured thickness of the barrier, the first distance, and the second distance may all be equal.

The alignment tool may include an elongated guide member configured to pass through an axially extending tab bore in the bolt, the elongated guide member comprising an attachment region configured to mechanically snap within the axially extending bore and hold the elongated guide member in a rigid position. Further, the elongated guide member may include a laterally extendable hook proximate a first end of the elongated guide member, wherein, prior to insertion of the alignment tool through the axially extending tab bore in the bolt, the alignment tool is positioned through the hole in the barrier so that the laterally extendable hook is in contact with a bottom surface of the barrier and the portion of the elongated guide member which extends beyond the top surface of the barrier is snapped, broken, or cut off.

Also provided are kits which include the adapters and alignment tools described herein, and methods of use of the devices and kits to install plumbing hardware through a barrier, such as a countertop, wall, or sink.

This summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following detailed description, figures, and claims.

BRIEF DESCRIPTION OF THE DRAWINGS

A better understanding of the present invention will be had upon reference to the following detailed description when read in conjunction with the accompanying drawings, wherein like numerals represent like features in the various views. It is to be noted that features and components in these drawings, illustrating views of embodiments of the present invention, unless stated to be otherwise, are not necessarily drawn to scale.

DETAILED DESCRIPTION OF THE INVENTION

Faucet assembly devices and kits are disclosed which provide installation of plumbing hardware, such as a sink faucet, from a top or front side of a barrier, such as a faucet side of a countertop, wall, or sink. Installation using the devices and/or kits of the present invention is less cumbersome, labor-intensive, and time-consuming than installation with traditional mechanisms, which require the user to tighten various plumbing hardware components from underneath the barrier while holding portions positioned above the barrier in place.

The device may comprise an adapter, and in certain situations may further include an alignment tool. For example, an alignment tool may be used to measure the thickness of the barrier, such as the thickness of the countertop, wall, or sink, by inserting a first end of the alignment tool into a hole designed to receive portions of the plumbing hardware, such as a water connection pipe of the faucet. The user may then hook the alignment tool onto a bottom edge of the barrier. A slider on the alignment tool may be moved to a position which pinches onto a top edge of the barrier, and a set screw may be tightened to hold the slider in place.

The adapter may then be threaded onto the plumbing hardware, such as the externally threaded water connection pipe on the faucet, using the alignment tool to set a proper height for the adapter. For example, a second end of the alignment tool may be designed to provide the proper height based on specific dimensions of the adapter, and on the thickness of the barrier as measured using the first end of the alignment tool. Finally, the faucet may be snapped into place on the barrier without the need for any further adjustment. Snap tabs, or other connection means, on the adapter may be used to hold the faucet securely in place on the barrier.

Kits comprising the adapters and corresponding alignment tools are also provided. The kits may include alignment tools that are configured for use with specific adapter configurations, or for use with various different adapter configurations (e.g., for different types of plumbing hardware). Further, the kits may include written and/or illustrated inserts which describe a method of use of the adapters and alignment tools for installation of plumbing hardware through a barrier, such as a countertop, wall, or sink.

Various aspects of the faucet assembly devices and kits of the present invention may be illustrated by describing components that are coupled, attached, and/or joined together. As used herein, the terms "coupled", "attached", and/or "joined" are interchangeably used to indicate either a direct connection between two components or, where appropriate, an indirect connection to one another through intervening or intermediate components. In contrast, when a component is referred to as being "directly coupled", "directly attached", and/or "directly joined" to another component, there are no intervening elements shown in said examples.

In the discussion that follows, "remateable mechanical coupling" or "remateably mechanically coupled" should be understood to mean that mechanical coupling can be established between two components and then broken. Moreover, "rotatable mechanical coupling" or "rotateably mechanically coupled" should be understood to mean that the mechanical coupling has a rotational degree of freedom, such that one component can be rotated about an axis of rotation with respect to another component while maintaining the mechanical coupling (e.g., a bolt and a nut).

Various aspects of the faucet assembly devices and kits of the present invention may be illustrated with reference to one or more exemplary implementations. As used herein, the term "exemplary" means "serving as an example, instance, or illustration," and should not necessarily be construed as preferred or advantageous over other variations of the devices, systems, or methods disclosed herein. "Optional" or "optionally" means that the subsequently described event or circumstance may or may not occur, and that the description includes instances where the event occurs and instances where it does not. In addition, the word "comprising" as used herein means "including, but not limited to".

Furthermore, throughout the specification, reference to "one embodiment," "an embodiment," or "some embodiments" means that a particular described feature, structure, or characteristic is included in at least one embodiment. Thus, appearances of the phrases "in one embodiment," "in an embodiment," or "in some embodiments" in various places throughout this specification are not necessarily all referring to the same embodiment. Those skilled in the art will recognize that the various embodiments can be practiced without one or more of the specific details or with other methods, components, materials, etc. In other instances, well-known structures, materials, or operations are not shown or not described in detail to avoid obscuring aspects of the embodiments.

Relative terms such as "lower" or "bottom" and "upper" or "top" may be used herein to describe one element's relationship to another element illustrated in the drawings. It will be understood that relative terms are intended to encompass different orientations of aspects of the faucet assembly device (e.g., adapters and alignment tools) in addition to the orientation depicted in the drawings. By way of example, if aspects of the adapters or alignment tools shown in the drawings are turned over, elements described as being on the "bottom" side of the other elements would then be oriented on the "top" side of the other elements as shown in the relevant drawing. The term "bottom" can therefore encompass both an orientation of "bottom" and "top" depending on the particular orientation of the drawing.

It must also be noted that as used herein and in the appended claims, the singular forms "a", "an", and "the" include the plural reference unless the context clearly dictates otherwise. Thus, for example, reference to "a" bolt, "an" alignment tool, "an" anchor tab, or "a" fixture, is a reference to one or more of each and equivalents thereof known to those skilled in the art, and so forth. Further, use of a plural reference in a specific context should not be taken to negate that a singular form found elsewhere within this description may also include the plural. Unless defined otherwise, all technical and scientific terms used herein have the same meanings as commonly understood by one of ordinary skill in the art.

Figure 1:
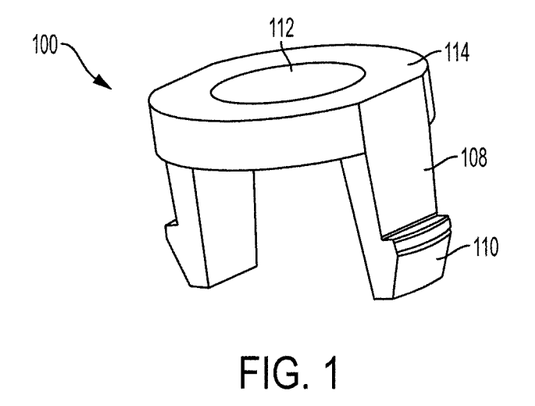
FIG. 1 is a drawing illustrating a perspective view of an adapter useful for installation of plumbing hardware on a barrier in accordance with an embodiment of the present disclosure.

With reference to FIG. 1, the faucet assembly device of the present invention includes an adapter 100 comprising a bolt 114 having an axially extending internally threaded bore 112. Further, the bolt 114 may include an anchor tab 108 which extends axially from the bolt 114 and comprises a radially extending protrusion 110. The adapter 100 may be configured to rotatably mechanically couple to an outer surface of a faucet fixture, such as the externally threaded water connection pipe on a faucet, and mount the faucet fixture through a hole in a barrier from a faucet side of the barrier. The anchor tab 108 may hold the faucet fixture securely on the barrier by a rigid mechanical coupling or connection with the barrier, or by a remateable mechanical connection coupling. In the latter, the connection or coupling may be broken and reformed more than once without damage to the connection that would significantly degrade the functionality of the faucet assembly device for further use.

Figure 2:
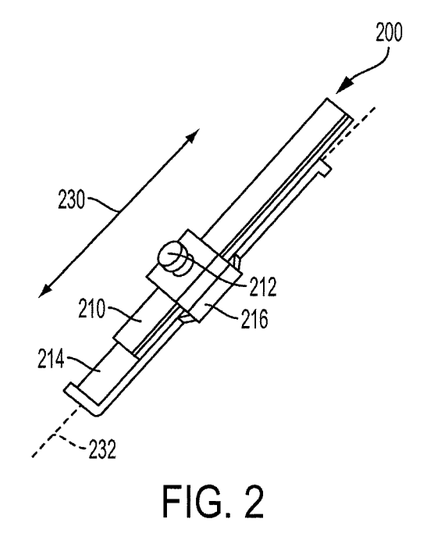
FIG. 2 is a drawing illustrating a perspective view of an alignment tool for proper positioning of the adapter shown in FIG. 1 in accordance with an embodiment of the present disclosure.

As shown in FIG. 2, the faucet assembly device may further comprise an alignment tool 200, which may be configured to measure a thickness of the barrier and provide alignment of the adapter 100 on the faucet fixture at a position corresponding to the measured thickness of the barrier.

As shown in FIG. 2, the alignment tool 200 may include a first elongated guide member 214, a second elongated guide member 210, and a collar 216 configured to hold the first and second elongated guide members together and allow the first and second elongated guide members to slide longitudinally relative to one another, such as along the direction 230 which parallels the longitudinal axis 232 of the alignment tool 200. The collar 216 may further include a tensioning knob 212 or set screw that may be tightened to secure a position of the two elongated guide members (210, 214) relative to one another.

Figure 3A:
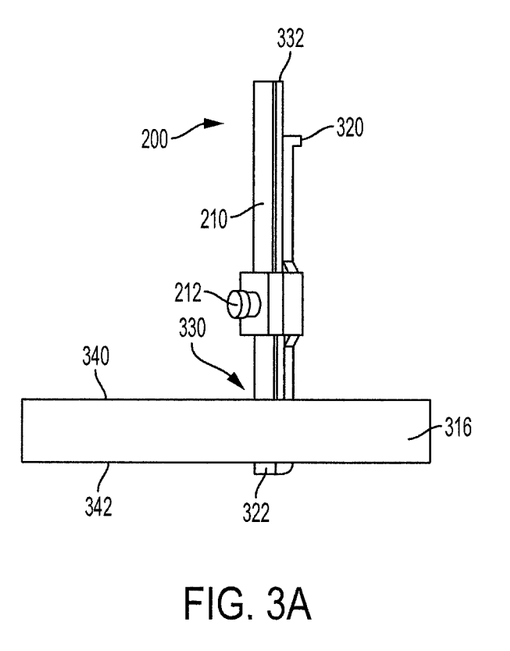
FIG. 3A is a drawing illustrating a side view of use of the alignment tool shown in FIG. 2 to measure a thickness of a barrier.

As shown in FIG. 3A, the alignment tool 200 may be used to measure a thickness of a barrier 316, such as a countertop, wall, or sink. The tensioning knob 212 may be unscrewed or loosened so that the second elongated guide member 210 may move along direction 230 relative to the first elongated guide member 214. A laterally extending hook 322 on a first end of the first elongated guide member 214 may be positioned against a bottom surface 342 of the barrier 316. The second elongated guide member 210 may be moved along direction 230 to position a first end 330 against a top surface 340 of the barrier 316. The tensioning knob 212 may then be tightened to secure the position of the two elongated guide members (210, 214) relative to one another. This position relates to a thickness of the barrier 316, or first distance, which is translated to an opposite end of the alignment tool 200 as a second distance.

With continued reference to FIG. 3A, the second distance is the distance between a laterally extending hook 320 on a second end of the first elongated guide member 214, and a second end 332 of the second elongated guide member 210. This second distance may be used to set a position of the adapter 100 on a piece of plumbing hardware, such as on a water connection pipe of a faucet.

Figure 3B:
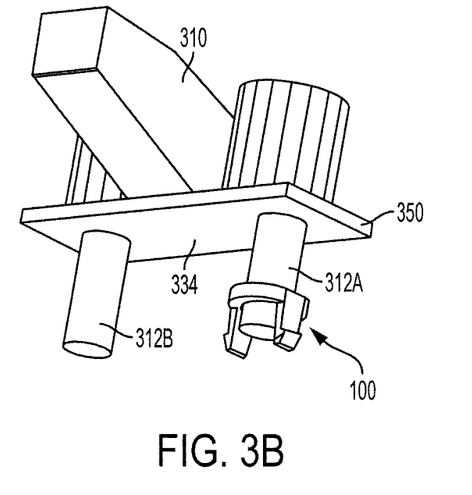
FIG. 3B is a drawing illustrating installation of the adapter shown in FIG. 1 on a faucet fixture.
Figure 3C:
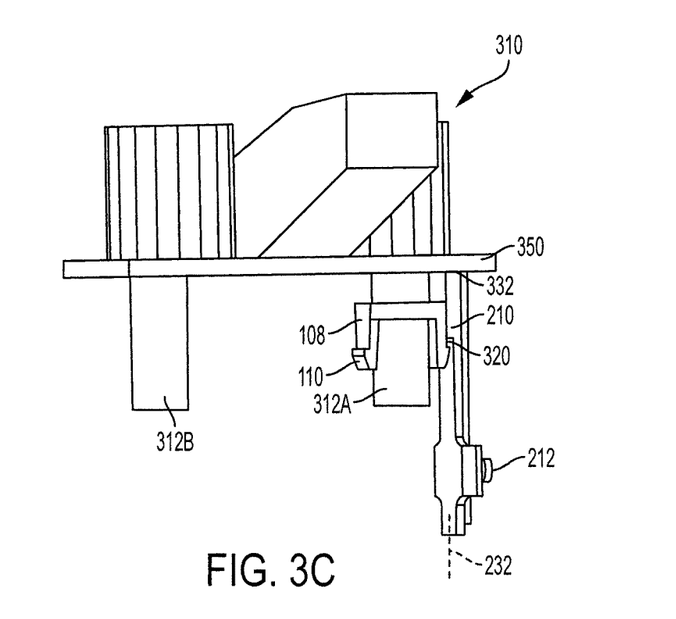
FIG. 3C is a drawing illustrating use of the alignment tool to position the adapter on the faucet fixture shown in FIG. 3B.

As shown in FIG. 3B, the adapter 100 may be rotatably mechanically coupled to an externally threaded water connection pipe (312A or 312B) on a faucet 310. The position of the adapter 100 on the pipe 312A may be determined by the second distance as registered on the alignment tool 200. As shown in FIG. 3C, the second end 332 of the second elongated guide member 210 may be abutted on a lower surface of a faucet 310, such as a lower surface 334 of a base plate 350. The adapter 100 may be rotatably mechanically coupled with the pipe 312A until the laterally extending hook 320 on the second end of the first elongated guide member 214 becomes hooked or positioned against the radially extending protrusion 110 of the anchor tab 108.

While FIGS. 1, 3B, 3C, 4A, and 4B show two anchor tabs 108 on the adapter 100, any number and arrangement of anchor tabs is within the scope of the present invention. For example, a single anchor tab may be included, wherein the single anchor tab may extend along a circumference of the bolt 114, and may include means to impart flexibility to the radially extending protrusion so that it may be forced through the hole in the barrier. Means to impart flexibility may include at least radial or axial seams in the anchor tab, or forming the anchor tab and/or radially extending protrusion from a flexible material. Additionally, one anchor tab may include more than one radially extending protrusion. Further, more than two anchor tabs may be included, such as three, four, five, six, etc.

Additionally, while the anchor tabs 108 are shown to be evenly positioned about a circumference of the adapter 100 and extend axially from a bolt region 114 of the adapter in a downward position (defined relative to the barrier, such that the anchor tabs 108 point away from the barrier 316 when the adapter 100 is installed therethrough), other configurations and designs are possible. Any means that may provide a secure attachment or connection of the adapter on the barrier is within the scope of the present invention.

A wide variety of materials may be used in forming the adapter 100 and the alignment tool 200 including at least a metal material, an insulator material, a plastic material, an organic material, an inorganic material and/or a composite material (such as carbon fiber). Furthermore, the adapter 100 and the alignment tool 200 may be fabricated using a wide variety of fabrication techniques as known to one of skill in the art, such as, for example, milling, machining, casting, stamping, 3-dimensional printing, deposition, etching and/or plating. The materials and methods for production of the adapter 100 may be the same as or different from the materials and methods for production of the alignment tool 200. Furthermore, the materials and methods for production of the various portions of each of the adapter 100 and the alignment tool 200 may be the same or may be different. For example, the materials and methods used to produce the collar 216 and the tensioning knob 212 may be different from the materials and methods used to produce the elongated guide members (210, 214) of the alignment tool 200.

Figure 4A:
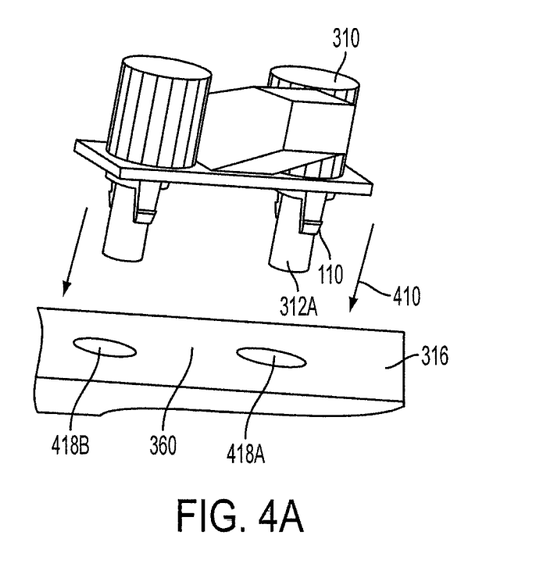
FIG. 4A is a drawing illustrating a perspective view of the faucet fixture with attached adapters as installed through respective holes in the barrier.
Figure 4B:
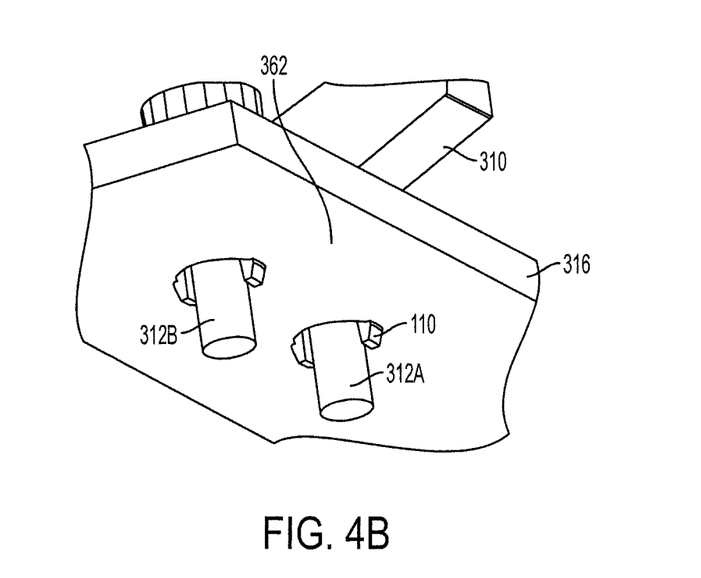
FIG. 4B is a drawing illustrating a perspective view from an underside of the barrier of the faucet fixture with attached adapters.

As shown in FIG. 4A, with adapters 100 properly positioned on the water connection pipes (312A, 312B) of the faucet 310, the combination (adapters 100 and faucet 310) may be pushed through respective holes (418A, 418B) in a top surface 360 of the barrier 316, such as along direction 410. As shown in FIG. 4B, when properly positioned on each of the water connection pipes (312A, 312B), the radially extending protrusions 110 of the anchor tabs 108 become engaged with the lower surface 362 of the barrier 316, snapping into place, to securely hold the faucet 310 on the barrier 316.

As shown in FIGS. 3A-3C, the first distance may be equal to the thickness of the barrier 316. The adapter 100 and alignment tool 200 may be configured so that the second distance, which is used to set the position of the adapter 100 on a water connection pipe (312A, 312B), may be equal to the first distance, and thus the thickness of the barrier 316. Depending on the design of the radially extending protrusions 110 and/or the anchor tab 108, the first and second distance may be the same, or may be different. That is, the design of the alignment tool 200 may be modified to accommodate various other designs for the adapter 100 and/or type of barrier 316. As such, the first distance and the second distance measured on the alignment tool may not be the same.

Furthermore, while laterally extending hooks (322, 320) are shown on the alignment tool 200, other designs capable of measuring a distance or thickness of a barrier are within the scope of the present invention. For example, the first and second ends of the first elongated guide member 314 may include tabs that may be manually extended. Similarly, while the first and second ends (330, 332) of the second elongated guide member 310 are shown to be absent of hooks or tabs, such may be included, and are within the scope of the present invention.

The collar 216 is designed to provide connection of the two elongated guide members (210, 214) and allow lateral movement relative to one another along direction 230, which parallels the longitudinal axis 232 of the alignment tool 200. Further, the tensioning knob 212 is included to provide a means to fix the position of the two elongated guide members (210, 214) with respect to one another. Other means of connecting the two elongated guide members (210, 214) and fixing their positions relative to one another are envisioned and within the scope of the present invention.

Figure 5A:
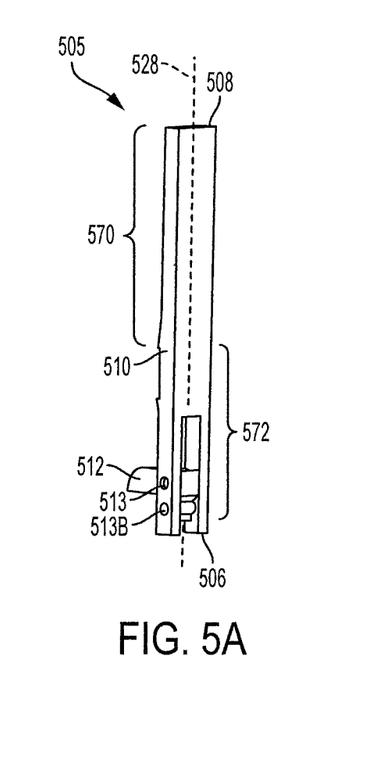
FIG. 5A is a drawing illustrating a side view of an alignment tool in accordance with an embodiment of the present disclosure.

With reference to FIGS. 5A-6C, an alternate alignment tool 505 and adapter 500 are illustrated. With reference to FIG. 5A, the alignment tool 505 may include an elongated guide member 510 configured to pass through an axially extending tab bore 550 in the adapter 500. The elongated guide member 510 may include an attachment region 554A configured to mechanically snap within the axially extending tab bore 550 and hold the elongated guide member 510 in a rigid position on the adapter 500. Further, the alignment tool 505 may include a laterally extendable hook 512 proximate at a first end 506 of the elongated guide member 510, wherein the hook 512 is rotatably mechanically coupled to the alignment tool 500, such as via a support member, projection, or a pin 513.

Figure 6A:
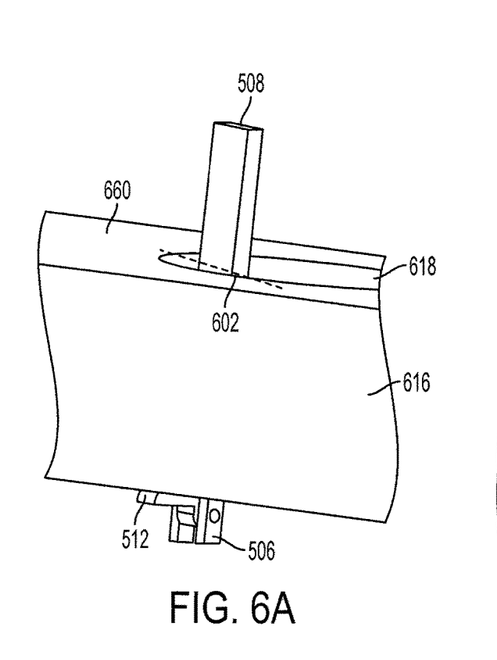
FIG. 6A is a drawing illustrating a perspective view of use of the alignment tool shown in FIG. 5A to measure a thickness of a barrier.
Figure 6B:
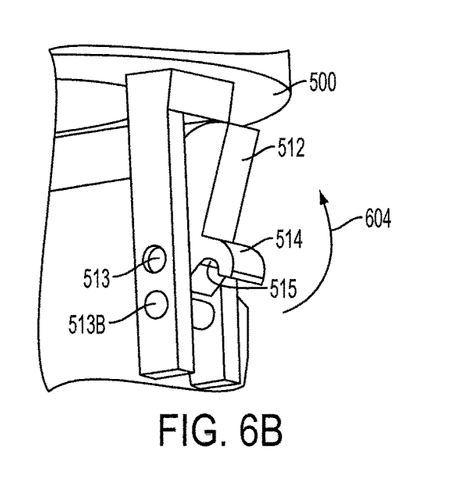
FIG. 6B is a drawing illustrating a close-up view of a laterally extendable hook at an end of the alignment tool shown in FIG. 5A.

With reference to FIG. 6B, the laterally extendable hook 512 may be rotatably mechanically coupled to the alignment tool 500 via a pin 513. Rotation (along path 604) of the laterally extendable hook 512 on the pin 513 may encompass a deployed position extending laterally from the elongated guide member 510, and a retracted position folded so that the hook 512 is aligned with the longitudinal axis 528 of the elongated guide member 510. Such rotation along the path 604 may allow the adapter 500, with the alignment tool 505 installed therein, to be inserted through a hole 618 in a barrier 616 without the hook 512 getting in the way, such as by making the diameter of the adapter 500 and alignment tool 505 too large to fit through the hole 618.

Also shown in FIG. 6B is an additional hook element 514 which may be included on an end of the laterally extendable hook 512, wherein the hook element 514 may provide resistance, such as by contact between an underside 515 of the hook element 514 and a pin 513B, which sets a stop point for a position of the laterally extendable hook 512 when deployed.

Figure 5B:
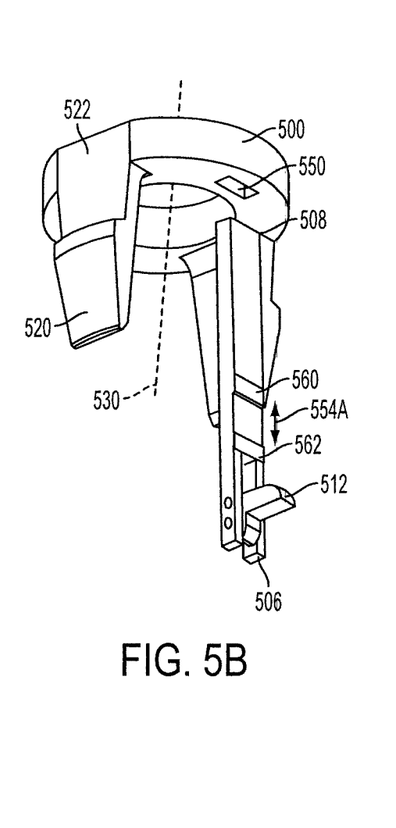
FIG. 5B is a drawing illustrating a perspective view of attachment of the alignment tool shown in FIG. 5A through a tab bore in an adapter in accordance with an embodiment of the present disclosure.
Figure 5C:
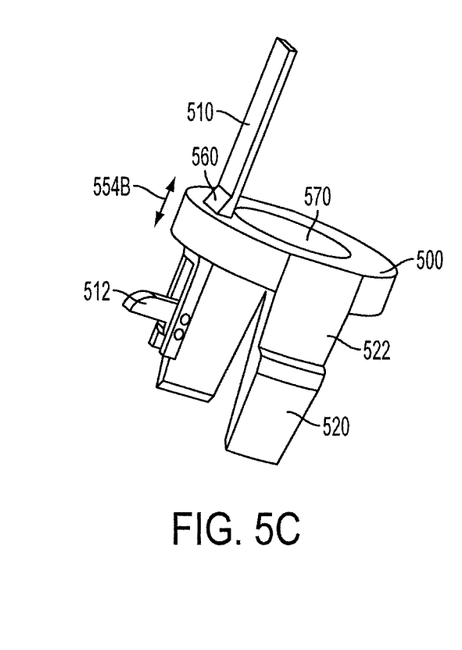
FIG. 5C is a drawing illustrating a perspective view of the alignment tool securely attached to the adapter shown in FIG. 5B.

As shown in FIGS. 5B and 5C, the size of the attachment region 554A of the alignment tool 505 may be defined by protrusions (only one labelled, 560) which lie along a top and bottom of the attachment region and provide a rigid mechanical connection with the tab bore 550 of the adapter 500. Further, the size of the attachment region 554A may correlate with an axial thickness 554B of the adapter 500. The adapter 500 (which may also be referred to as a bolt 500) is shown to include an internally threaded axial bore 570, and an anchor tab 522 extending axially from the adapter 500 and having a radial protrusion 520.

Figure 6C:
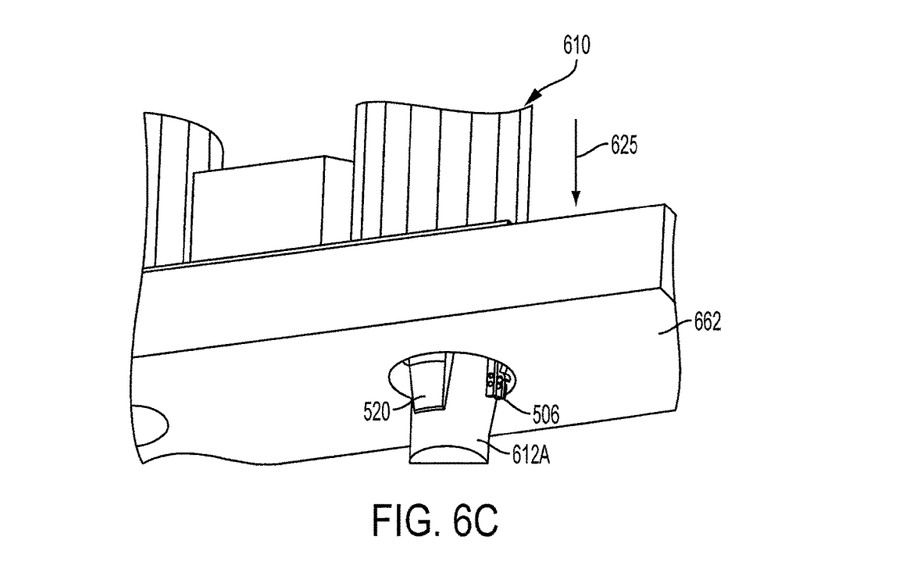
FIG. 6C is a drawing illustrating a perspective view from an underside of the barrier of the faucet fixture with an attached adapter.

As discussed above with reference FIGS. 1, 3B, 3C, 4A, and 4B, while FIGS. 5B, 5C, and 6C show two anchor tabs 522 on the adapter 500, wherein each anchor tab 522 has a radially extending protrusion 520, any number and arrangement of anchor tabs and radially extending protrusions is within the scope of the present invention. Further, while the anchor tabs 522 are shown to be evenly positioned about a circumference of the adapter 500 and extend axially from a bolt region of the adapter (along symmetry axis 530 shown in FIG. 5B) in a downward position (defined relative to the barrier when installed therethrough), other configurations and designs are within the scope of the present invention.

With specific reference to FIG. 6A, the elongated guide member 510 of the alignment tool 505 may be used to measure a thickness of a barrier 616, such as a countertop, wall, or sink. The alignment tool 505 may be positioned on an edge of a barrier 616, such as through the hole 618 in the barrier 616, so that the laterally extendable hook 512 on the bottom 506 of the elongated guide member 510 may be positioned against a bottom surface of the barrier 616. A portion of the elongated guide member 510 that extends above a top surface 660 of the barrier 616 may be marked, such as along line 602.

This portion of the elongated guide member 510 that extends above this line 602 may be removed; such as by cutting, snapping, or even breaking along predefined guide lines. As such, the alignment tool 505 may include break lines along an upper portion 570 of the elongated guide member 510. Alternatively, or in addition, the upper portion 570 of the elongated guide member 510 may have a smaller thickness than a lower portion 572, so that the portion of the elongated guide member 510 that extends above line 602 may be more easily removed.

With reference to FIG. 5C, the alignment tool 505 may then be pushed through the axially extending tab bore 550 in the adapter 500 until the attachment region 554A snaps into place within the tab bore 550 of the adapter 500. The protrusions positioned along a top 560 and bottom of the attachment region 554A may hold the alignment tool 505 in position within the tab bore 550.

The adapter 500 may then be rotatably mechanically coupled to an externally threaded water connection pipe 612A on a faucet 610 (see FIG. 6C). The position of the adapter 500 on the pipe 612A may be determined by the marked or broken end 508 (along line 602) of the alignment tool 505. As the adapter 500 is rotatably mechanically coupled onto the externally threaded water connection pipe 612A, the end 508 of the alignment tool 505 will come into contact with an underside of the faucet fixture, such as an underside of a base plate (see for example the underside 334 of the base plate 350 shown in FIG. 3B). This provides a stop position for the adapter 500 on the water connection pipe 612A that correlates with the thickness of the barrier 616.

As shown in FIG. 6C, with the adapter 500 properly positioned on the water connection pipes 612A of the faucet 610, the combination (adapter 500 and faucet 610) may be pushed through a hole 618 in a top surface 660 of the barrier 616, such as along direction 625. As shown in FIG. 6C, when properly positioned on the water connection pipe 312A, the radially extending protrusions 520 of the anchor tabs 522 become engaged with the lower surface 662 of the barrier 616, snapping into place, to securely hold the faucet 610 on the barrier 616. Also shown is the bottom end 506 of the alignment tool 505 showing that the laterally extendable hook 512 is retracted (folded up along the longitudinal axis 528 of the alignment tool 505).

Figure 7A:
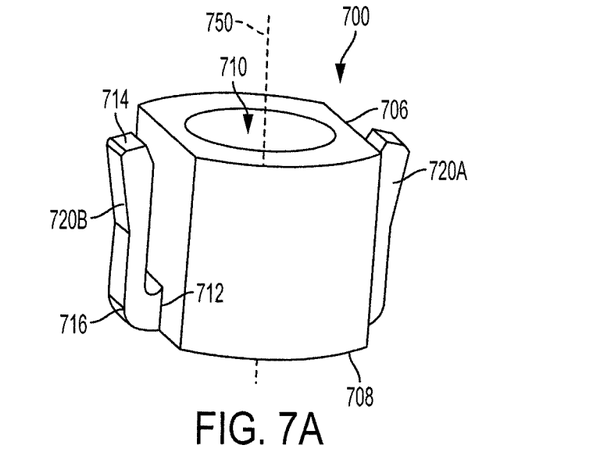
FIG. 7A is a drawing illustrating a perspective view of an adapter in accordance with an embodiment of the present disclosure.
Figure 7B:
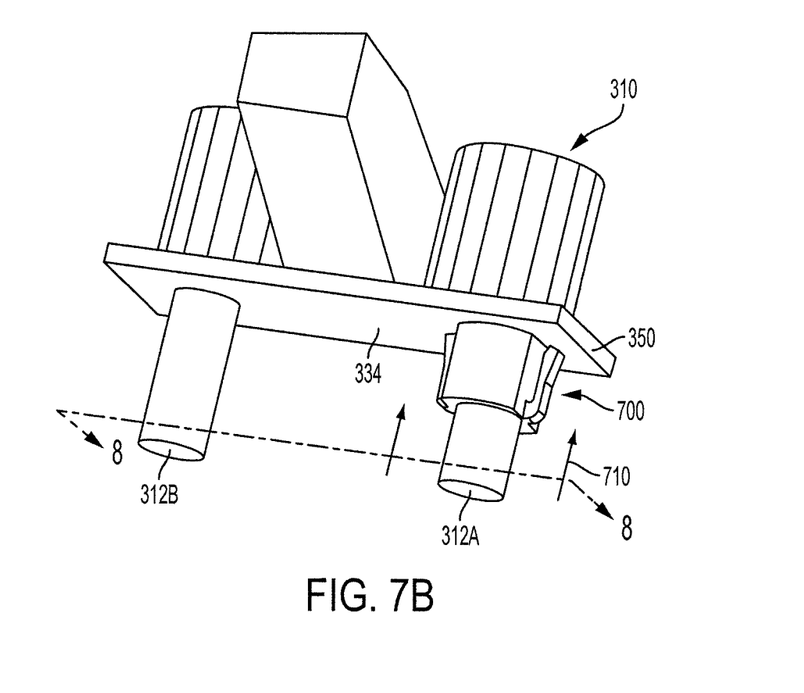
FIG. 7B is a drawing illustrating a perspective view of the adapter shown in FIG. 7A attached to a faucet fixture.
Figure 8:
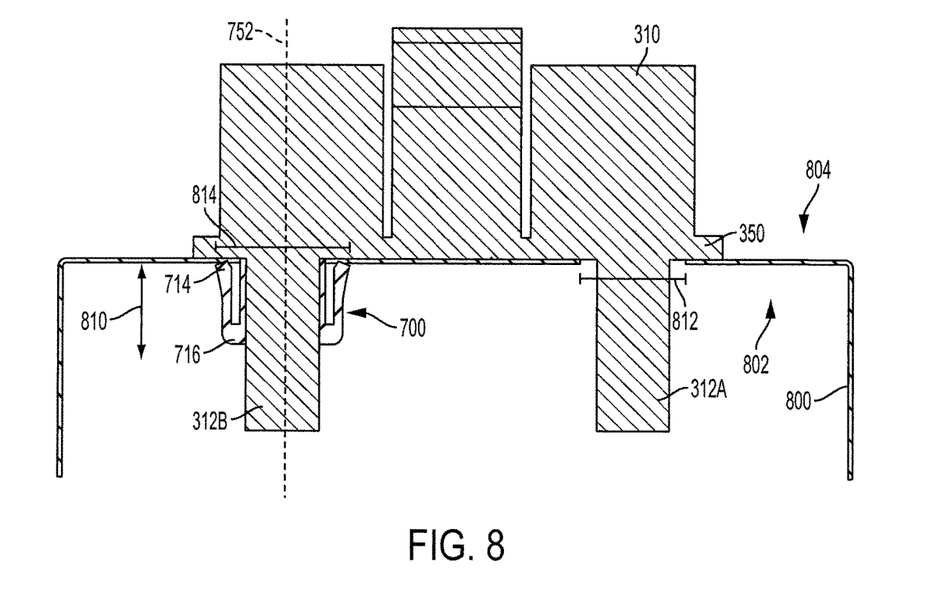
FIG. 8 is a drawing illustrating a cross-sectional view taken along line 8-8 of FIG. 7B of a faucet fixture with an attached adapter as installed through a barrier.

With reference to FIGS. 7A-8, an alternate adapter 700 is illustrated. With reference to FIG. 7A, the adapter 700 includes an internally threaded bore 710 and an anchor tab 716 extending radially from the adapter 700 proximate a second axial end 708 of the adapter 700, such as at a connection point 712. The anchor tab 716 may extend in a direction parallel to a longitudinal axis 750 of the adapter 700, along an external surface thereof, and may include a radially extending protrusion 720A (720B) at one end.

As shown, the adapter 700 may be shaped to accommodate the upward configuration of the anchor tab 716, such as by reducing the circumferential size of the adapter 700 in the region along which the anchor tab 716 lies (e.g., flatten the sides of the adapter). While the connection point 712 for the anchor tab 716 on the adapter 700 is shown to be near an axial end 708 of the adapter 700, the connection point may be positioned at other locations about the external surface of the adapter 700, such as midway up the axial length of the adapter 700. As indicated above, the adapter is designed and configured to rotatably mechanically couple to an externally threaded water connection pipe of a faucet, and provide a means to securely attach the faucet to a barrier. As such, other arrangements of tabs or connectors on the adapter which may provide this function are within the spirit and scope of the present invention.

Furthermore, as discussed above with reference to the other adapter configurations (such as shown in FIGS. 1 and 5B), while the adapter 700 is shown to have two anchor tabs 716, wherein each anchor tab 716 may have a radially extending protrusion (720A, 720B), any number and arrangement of anchor tabs and radially extending protrusions is within the scope of the present invention. Further, while the anchor tabs 716 are shown to be evenly positioned about a circumference of the adapter 700 and extend axially from a bolt region of the adapter (along symmetry axis 750 shown in FIG. 7A) in an upward position (defined relative to the bottom surface 708 of the adapter 700 and/or the barrier, such that the anchor tabs 716 point toward the barrier 800 when the adapter 700 is installed therethrough), other configurations and designs are within the scope of the present invention.

Also shown in FIGS. 7A-8 is an end surface 706 of the adapter 700 that may come into contact with an underside 334 of a base plate 350 on a faucet fixture 310, and an end surface 714 of the anchor tab 716 which may come into contact with an underside 802 of the barrier 800. The distance between the end 714 of the anchor tab 716 and the end 706 of the adapter 700 may be configured to equal the thickness of the barrier 800 on which the adapter 700 will be used to secure the faucet fixture 310.

Rotatable mechanical coupling of the adapter 700 to an externally threaded water connection pipe 312A on a faucet 310 (see FIG. 7B) in the direction shown by arrow 710 will bring the end surface 706 of the adapter 700 into contact with the underside 334 of the base plate 350 on the faucet fixture 310. As indicated, the distance between the end 714 of the anchor tab 716 and the underside 334 of the base plate 350 of the faucet fixture 310 will equal the thickness of the barrier. Thus, once the adapter 700 is fully rotatably mechanically coupled with the externally threaded water pipe 312A of the faucet 310, the combination (adapter 700 and faucet 310) may be pushed through a hole in a top surface 804 of the barrier 800 along direction 810, which is parallel with a symmetry axis 752 of the hole in the barrier 800.

As shown in FIG. 8, when properly positioned on the water connection pipe 312A, the radially extending protrusions 720A of the anchor tabs 716 become engaged with the lower surface 802 of the barrier 800, snapping into place, to securely hold the faucet 310 on the barrier 800. Generally, the diameter 814 to which the anchor tab(s) 716 extend may be wider than a diameter 812 of a hole in the barrier 800. Thus, the connection point 712 or the anchor tabs 716 may have an amount of flexibility sufficient to allow passage of the adapter 700 through a hole in the barrier 800.

In this configuration, the alignment tool may be a distance between a first end of the anchor tab and a first axial end of the adapter, wherein the distance corresponds to the thickness of the barrier. Exemplary barriers include at least a wall, countertop, or sink, wherein the barrier may be formed of any material such as, for example, 18 gauge steel.

The adapter 700 may further include moveable anchor tabs 716. That is, the connection end 712 of the anchor tab 716 may be moveable, such as along an axial length of the adapter, so that the distance between the end 714 of the anchor tab 716 and the end 706 of the adapter 700 may be configured to equal the thickness of the barrier 800 on which the adapter 700 will be used to secure the faucet fixture 310.

Such may be accomplished by at least a slot along an axial length of the adapter in which the anchor tab 716 may slide, or various axially placed holes or apertures in which an end of the anchor tab 716 (at or near the connection point 712) may be placed.

Also provided are kits which include the adapters and alignment tools described herein, and methods of use of the devices and kits to install plumbing hardware through a barrier, such as a countertop, wall, or sink. The kits may include a written and/or illustrated insert that may describe a method of use of the adapter and/or alignment tool to install plumbing hardware through a barrier.

Also provided are methods of use of any of the faucet assembly devices described herein. The method may comprise measuring a thickness of a barrier using any of the disclosed alignment tools, connecting any of the disclosed adapters on an externally threaded water connection pipe of a faucet to a position coincident with the measured thickness, and installing the faucet though a hole in the barrier from a top or faucet side of the barrier so that the faucet is securely connected to the barrier. As disclosed herein, installation of the faucet fixture through the barrier is generally achieved by pushing the water connection pipe, having the adapter connected thereon, through the hole in the barrier. As such, there may be not need to rotate the faucet about an axis of the hole in the barrier, such as would be required for a threaded connection. Because of this, the installation method is much simpler, and can accommodate simultaneous connection of faucet fixtures having more than one water connection pipe.

Each of the characteristics and examples described above, and combinations thereof, may be said to be encompassed by the present invention. The present invention is thus drawn to the following non-limiting aspects:

(1) A faucet assembly device comprising an adapter which includes a bolt having an axially extending internally threaded bore; and an anchor tab extending axially from the bolt, the anchor tab comprising a radially extending protrusion, wherein the adapter is configured to rotatably mechanically couple to an outer surface of a faucet fixture and mount the faucet fixture through a hole in a barrier from a faucet side of the barrier, and wherein the anchor tab holds the faucet fixture securely on the barrier.

(2) The faucet assembly device of aspect 1, comprising an alignment tool configured to measure a thickness of the barrier and provide alignment of the adapter on the faucet fixture at a position corresponding to the measured thickness.

(3) The faucet assembly device according to any of aspects 1 or 2, wherein the alignment tool comprises a distance between a first end of the anchor tab and a first axial end of the bolt, wherein the distance corresponds to the thickness of the barrier.

(4) The faucet assembly device according to any of aspects 1 to 3, wherein the barrier is any of 16 gauge metal, 18 gauge metal, 20 gauge metal, 3 centimeters stone, 2 centimeters stone.

(5) The faucet assembly device according to any of aspects 1 to 4, wherein the anchor tab comprises at least two anchor tabs, wherein each anchor tab extends radially from the bolt proximate a second axial end of the bolt and runs parallel to an external surface of the bolt along a longitudinal symmetry axis of the bolt, each anchor tab comprising the radially extending protrusion at the first end thereof, wherein the at least two anchor tabs are evenly spaced about a circumferential surface of the bolt.

(6) The faucet assembly device according to any of aspects 1, 2, 3, or 5, wherein the alignment tool comprises a first elongated guide member; a second elongated guide member; and a collar configured to hold the first and second elongated guide members together and allow the first and second elongated guide members to slide longitudinally relative to one another.

(7) The faucet assembly device according to aspect 6, wherein the first elongated guide member comprises a laterally extending hook at each of a first and second end thereof, wherein the measured thickness of the barrier is measured as a first distance between (a) the laterally extending hook at a first end of the first elongated guide member when in contact with a bottom surface of the barrier and (b) a first end of the second elongated guide member when in contact with a top surface of the barrier.

(8) The faucet assembly device according to aspect 7, wherein the first distance corresponds to a second distance between the lateral hook at the second end of the first elongated guide member and the second end of the second elongated guide member, the alignment tool configured to use the second distance to provide alignment of the adapter on the faucet fixture.

(9) The faucet assembly device according to aspect 8, wherein the measured thickness of the barrier, the first distance, and the second distance are equal.

(10) The faucet assembly device according to any of aspects 1, 2, 3, or 5, wherein the alignment tool comprises an elongated guide member configured to pass through an axially extending tab bore in the bolt, the elongated guide member comprising an attachment region configured to mechanically snap within the axially extending bore and hold the elongated guide member in a rigid position.

(11) The faucet assembly device according to aspect 10, wherein the elongated guide member comprises a laterally extendable hook proximate a first end of the elongated guide member, wherein, prior to insertion of the alignment tool through the axially extending tab bore in the bolt, the alignment tools is positioned through the hole in the barrier so that the laterally extendable hook is in contact with a bottom surface of the barrier and the portion of the elongated guide member which extends beyond the top surface of the barrier is snapped, broken, or cut off.

(12) The faucet assembly device according to any of aspects 1 to 11, wherein the anchor tab comprises at least two anchor tabs evenly spaced about a circumferential surface of the bolt.

(13) A faucet assembly kit comprising any of the faucet assembly devices of aspects 1 to 12.

(14) The faucet assembly kit according to aspect 13, comprising a written and/or illustrated insert that describes a method of use of the kit to install plumbing hardware through a barrier.

(15) A method of use of any of the faucet assembly devices according to aspects 1 to 12, comprising measuring a thickness of a barrier using an alignment tool, connecting an adapter on an externally threaded water connection pipe of a faucet to a position coincident with the measured thickness, and installing the faucet though a hole in the barrier from a top or faucet side of the barrier so that the faucet is securely connected to the barrier.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A faucet assembly kit comprising:
   an adapter comprising:
      a bolt having an axially extending internally threaded bore, and
      an anchor tab extending axially from the bolt, the anchor tab comprising a radially extending protrusion; and
   an alignment tool configured to measure a thickness of a barrier and provide alignment of the adapter on a faucet fixture at a position corresponding to the measured thickness,
   wherein the adapter is configured to be introduced into a hole in the barrier from a faucet side of the barrier.

2. The kit of claim 1, wherein the anchor tab comprises:
   at least two anchor tabs evenly spaced about a circumferential surface of the bolt.

3. The kit of claim 1, wherein the alignment tool comprises:
   a first elongated guide member;
   a second elongated guide member; and
   a collar configured to hold the first and second elongated guide members together and allow the first and second elongated guide members to slide longitudinally relative to one another.

4. The kit of claim 3, wherein the first elongated guide member comprises a laterally extending hook at each of a first and second end thereof, wherein the measured thickness of the barrier is measured as a first distance between (a) the laterally extending hook at a first end of the first elongated guide member when in contact with a bottom surface of the barrier and (b) a first end of the second elongated guide member when in contact with a top surface of the barrier.

5. The kit of claim 4, wherein the first distance corresponds to a second distance between the lateral hook at the second end of the first elongated guide member and the second end of the second elongated guide member, the alignment tool configured to use the second distance to provide alignment of the adapter on the faucet fixture.

6. The kit of claim 1, wherein the alignment tool comprises:
   an elongated guide member configured to pass through an axially extending tab bore in the bolt, the elongated guide member comprising an attachment region configured to mechanically snap within the axially extending tab bore and hold the elongated guide member in a rigid position.

7. The kit of claim 6, wherein the elongated guide member comprises:
   a laterally extendable hook proximate a first end of the elongated guide member,
   wherein, prior to insertion of the alignment tool through the axially extending tab bore in the bolt, the alignment tools is positioned through the hole in the barrier so that the laterally extendable hook is in contact with a bottom surface of the barrier and the portion of the elongated guide member which extends beyond the top surface of the barrier is snapped, broken, or cut off.

8. A faucet assembly kit comprising:
   an adapter comprising:
      a bolt having an axially extending internally threaded bore, and
      at least two anchor tabs extending axially from the bolt and evenly spaced about a circumferential surface of the bolt, each anchor tab comprising a radially extending protrusion; and
   an alignment tool comprising:
      a first elongated guide member,
      a second elongated guide member, and
      a collar configured to hold the first and second elongated guide members together and allow the first and second elongated guide members to slide longitudinally relative to one another,
   wherein the alignment tool is configured to measure a thickness of a barrier as a first distance between (a) a laterally extending hook at a first end of the first elongated guide member when in contact with a bottom surface of the barrier and (b) a first end of the second elongated guide member when in contact with a top surface of the barrier,
   wherein the first distance corresponds to a second distance between (c) a lateral hook at a second end of the first elongated guide member and (d) a second end of the second elongated guide member, the alignment tool configured to use the second distance to provide alignment of the adapter on the faucet fixture
   wherein the adapter is configured to rotatably mechanically couple to an outer surface of the faucet fixture to a position corresponding to the second distance, and mount the faucet fixture through a hole in the barrier from a faucet side of the barrier, the anchor tabs holding the faucet fixture securely on the barrier.

* * * * *